(12) United States Patent
Walsh, Jr.

(10) Patent No.: US 7,731,100 B2
(45) Date of Patent: Jun. 8, 2010

(54) JOINING THE MIXING AND VARIABLE GAS ATOMIZING OF REACTIVE CHEMICALS IN FLUE GAS CLEANING SYSTEMS FOR REMOVAL OF SULFUR OXIDES, NITROGEN OXIDES AND MERCURY

(76) Inventor: William Arthur Walsh, Jr., 250 No. Bay St., Manchester, NH (US) 03104-2324

( * ) Notice: Subject to any disclaimer, the term of this patent is extended or adjusted under 35 U.S.C. 154(b) by 0 days.

(21) Appl. No.: 12/462,831

(22) Filed: Aug. 10, 2009

(65) Prior Publication Data
US 2010/0068111 A1 Mar. 18, 2010

Related U.S. Application Data

(60) Provisional application No. 61/188,739, filed on Aug. 12, 2008.

(51) Int. Cl.
| | |
|---|---|
| *B05B 17/04* | (2006.01) |
| *B05B 17/00* | (2006.01) |
| *B05B 7/00* | (2006.01) |
| *B05B 1/14* | (2006.01) |
| *B01D 53/50* | (2006.01) |
| *B01D 53/56* | (2006.01) |
| *B01D 53/60* | (2006.01) |
| *B01D 50/00* | (2006.01) |

(52) U.S. Cl. .................. 239/9; 239/8; 239/10; 239/11; 239/419; 239/420; 239/424; 239/433; 239/562; 239/568; 239/597; 423/242.1; 422/168

(58) Field of Classification Search ............... 239/8–11, 239/398, 418, 419, 419.3, 420, 422, 423, 239/424, 424.5, 425, 428, 433, 434.5, 548, 239/556, 557, 562, 566, 568, 589, 592, 594, 239/597; 423/210, 242.1, 243.01, 243.02; 422/168, 170, 172; 261/115–118
See application file for complete search history.

(56) References Cited

U.S. PATENT DOCUMENTS

| | | | |
|---|---|---|---|
| 4,314,670 A | 2/1982 | Walsh, Jr. | |
| 4,891,170 A * | 1/1990 | Kokkonen et al. | .......... 261/116 |
| 6,102,377 A * | 8/2000 | Doughty | ..................... 261/117 |

(Continued)

OTHER PUBLICATIONS

Duct Injection for SO2 Control, Design Handbook, vol. 1, Process Design and Engineering Guidelines, U.S. Department of energy.

*Primary Examiner*—Darren W Gorman

(57) ABSTRACT

Diverse methods of utilization and the corresponding, related modifications, of linear type, Variable Gas Atomization (VGA) nozzles and lances are described. Therein is joined the mixing and gas atomization of chemicals that react to form active products that further react with harmful flue gas constituents of combustion so as to enable their effective collection. One version combines, in a lance assembly of nozzles, the injection of reactants, in the form of finely divided dry solids conveyed in a carrier air stream, and the fine atomization of water, aqueous solutions or slurries. Atomization of such streams is employed to effectively wet the surfaces of the dry particles and, thereby, promote the rapid sorption of gaseous constituents of flue gas being treated. Another version simultaneously mixes and atomizes reacting chemicals to produce, and release into the flue gas stream, strongly oxidizing, transient, species of their reaction products. The simultaneous atomization and chemical reaction enables the effective capture of targeted flue gas constituents.

6 Claims, 5 Drawing Sheets

U.S. PATENT DOCUMENTS

| | | |
|---|---|---|
| 6,303,083 B1 | 10/2001 | Johnson |
| 6,613,133 B2 * | 9/2003 | Piaskowski et al. ........... 96/322 |
| 6,676,912 B1 | 1/2004 | Cooper |
| 7,514,053 B2 | 4/2009 | Johnson |
| 2004/0062697 A1 | 4/2004 | Morison |
| 2004/0071628 A1 | 4/2004 | Costa |
| 2004/0195402 A1 | 10/2004 | Joshi |
| 2004/0197252 A1 | 10/2004 | Parrish |
| 2005/0019229 A1 | 1/2005 | Parrish |
| 2005/0039598 A1 | 2/2005 | Srinivasachar |
| 2005/0214187 A1 | 9/2005 | Johnson |
| 2005/0255019 A1 | 11/2005 | Parrish |
| 2005/0255022 A1 | 11/2005 | Parrish |
| 2006/0021506 A1 | 2/2006 | Hakka |
| 2006/0102057 A1 | 5/2006 | Aradi |
| 2006/0239878 A1 | 10/2006 | Lee |
| 2008/0250715 A1 | 10/2008 | Cooper |
| 2009/0090654 A1 | 4/2009 | Duyvesteyn |
| 2009/0166448 A1 | 7/2009 | Wurz |

* cited by examiner

JOINING THE MIXING AND VARIABLE GAS ATOMIZING OF REACTIVE CHEMICALS IN FLUE GAS CLEANING SYSTEMS FOR REMOVAL OF SULFUR OXIDES, NITROGEN OXIDES AND MERCURY

CROSS REFERENCE TO RELATED APPLICATIONS

This application claims the benefit of PPA Ser. No. 61/188,739 filed Aug. 12, 2008

BACKGROUND OF THE INVENTION

1. Field of the Invention

This invention relates to methods and means for combining the mixing, reaction and compressed air atomization of reactive chemicals. It employs and expands upon the teachings of expired patent, "Variable Gas Atomization," U.S. Pat. No. 4,314,670 (referred to herein as VGA), which was issued to this writer on Feb. 9, 1982. It comprises specific improvements to the atomizing nozzle configuration thereof that enable effective removal of harmful combustion gas stream constituents. It specifically relates to the removal of sulfur oxides, nitric oxides and mercury. It further relates to means of modification of conventional flue gas duct configuration so as to provide an effective and economical flue gas cleaning system via in-duct injection in existing utility, commercial and industrial power plants.

2. Description of the Prior Art

The need for providing cost-effective removal of the deleterious constituents emitted in the combustion of coal and other fossil fuels has long plagued the utility industry. The gaseous atmospheric contaminants of primary concern consist of four categories; namely, sulfur oxides, nitrogen oxides, mercury and carbon dioxide. Development of methods of eliminating them from the flue gas by use of scrubbers has been undertaken with varying degrees of success. To date, successful removal on a full scale level has been limited to sulfur dioxide, the primary acid rain producing constituent emitted in coal combustion. This was initially done by finely atomizing lime slurries in large spray dryers. Since the enactment of the 1990 Clean Air Act Amendments, these have been largely superseded by the use of scrubbers. In wet scrubbers, coarsely sprayed slurry is continuously re-circulated to the top of a tower to cascade downward within the up-flowing flue gas stream. The liquid is distributed throughout the gas stream in order to expose the gas to maximum liquid surface contact and achieve maximum utilization of the lime. The wet-collected spent lime is subsequently de-watered for disposal or by-product recovery. Much of the sulfur trioxide present converts to sulfuric acid mist during the rapid quenching of the flue gas to its wet bulb temperature and is released with the emitted flue gas. In circulating fluidized-bed scrubbers, over 90% of the solid, collected in a dry or semi-dry state, is recycled and rewetted to produce a dense, fluidized bed that is suspended in the up-flowing flue gas stream. As the water content evaporates the solids content is carried out in it to be electro-statically separated or collected by filters. Because both of these methods involve high capital and operating costs, their installation has been generally limited to larger and newer power plant units. In these cases, the high costs are ameliorated by scale-up factors. Neither of these methods removes the nitrogen oxides or mercury present.

A major government and industry sponsored, program was undertaken, during the period of 1986-1992, to develop a lower cost method of sulfur dioxide removal that would enable economic retrofit of the many existing, smaller and older, coal-fired power plants. The process, termed "In-duct Injection," involves injecting lime directly into existing flue gas ducts so as to eliminate the costly addition of spray dryers and scrubbers. Two methods of lime injection were employed. One consisted of atomizing aqueous lime slurries. The sulfur dioxide gas is absorbed into the slurry droplets to react with the lime present as dissolved calcium hydroxide. The other method involved atomizing water, plus blowing dry, hydrated lime, separately, into the duct. The water served both to solubilize the lime by wetting the dry particles and to cool and humidify the flue gas. Although it showed promise as a lower cost method, it was nevertheless abandoned. This was primarily because many of the existing plants had been grandfathered in the 1970's under the Clean Air Act enactments, but also because of its limited technical success. Many of the existing US, coal-fired utilities subsequently converted to low-sulfur coal in the 1990's in an effort to meet the sulfur dioxide emission limitations; however, these non-scrubbed units will not meet the recent new reduced emission limits.

The results and conclusions of the many individual contracts awarded by the US Department of Energy (DOE) are summarized in the "Design Handbook of Duct Injection for $SO_2$ Control" that was published in 1993. Coupled with the slowdown in retrofitting during the implementation of the Clean Air Act Amendments, major generic retrofit-design problems remained. These prevented adequate conceptual design and field development for duct injection and its adoption by industry. The maximum feasible amount of $SO_2$ removed was only 50%. In addition an excessively large amount of hydrated lime (calcium/sulfur ratio of 2.5 to 3 times the theoretical) was required, which resulted in excessively high cost of reagent and waste disposal.

It is believed by this writer that the operating conditions that prevailed in the test programs prevented near completion of the chemical reaction and, thereby, reduced the overall performance. Contributing factors to these limitations were the comparatively large droplet sizes produced by the commonplace nozzles used and the limited gas residence time of 1-2 seconds available in the horizontal duct injection tests. The time limitation resulted from duct lengths of approximately only 100 ft., plus the need for a minimum flue gas velocity in horizontal ducts of approximately 50-60 ft/sec. This is required to prevent settling and fallout of solid particles or spray droplets. An industry survey by DOE had indicating that straight-section duct lengths in existing power plants were generally limited to around 100 ft.

Compressed air-atomizing nozzle designs are generally used for injecting chemicals into flue gas ducts in order to produce a spray of fine droplets. As conventionally designed, they typically form a conical spray pattern that is produced as the result of specific nozzle configurations used. The general purpose of nozzle design is to produce compressed air and liquid stream intersection, interaction and liquid breakup through stream impingement or internal swirling. The nozzle configurations are also designed to maximize the shearing force between the air and the droplets initially formed, so as to thereby cause additional subsequent, or secondary, droplet break-up. The diameter of their liquid orifices, or the width of their sheet-forming openings, cannot be varied. The ability to produce fine droplet sizes by use of thin liquid streams is also limited by the need to prevent clogging by solid particles that can be present. An inherent characteristic of the conical spray patterns generally produced is that, because the largest droplets generally exit the nozzle at widest angle, they can collide with droplets exiting adjoining nozzles to cause droplet growth. Because of the wide spray divergence angles employed, moreover, droplet-to-droplet and droplet-to-duct wall impingement can result.

As customarily practiced with in-duct injection of dry (hydrated) lime, $Ca(OH)_2$, the dry lime was conveyed by separate distribution nozzles generally located upstream, downstream or in the same plane of the water atomizing nozzles. In order to obtain the fullest reaction of injected chemicals in the minimum time, the liquid surface area exposed to the flue gas must be maximized. In wet scrubbers and circulating fluid bed scrubbers, this is accomplished by recirculation of a high percentage of the injected material. With spray drying and in-duct injection of reagent solutions or slurries, this is best done by finely atomizing and suspending the liquid in the gas stream. In the case of injection of dry, finely divided, reactive chemicals, such as lime, surface wetting is required for solubilization. $SO_2$ sorption is accomplished with associated injection of finely atomized water spray. The finely atomized water spray serves two functions, namely, promoting the wetting of the surfaces of the conveyed lime particles and the cooling of the flue gas. The surface wetting serves to dissolve a portion of the lime, and the gas cooling promotes the absorption of gaseous $SO_2$ molecules for their reaction in the solution.

It was believed that a real need existed for nozzles that could produce fine atomization at high liquid flow rates and distribute the fine spray uniformly throughout the large cross-sectional areas of power plant flue gas ducts. A program of design, testing and demonstration of a linear version of VGA nozzles, such as that illustrated in FIG. 2, was therefore undertaken (The term "VGA nozzles," as used herein, refers to nozzles utilizing the method and means of U.S. Pat. No. 4,314,670.). In the linear version, the liquid is inserted at low velocity as a very thin, planar sheet, directly into a flat-slit-shaped exit throat of a compressed air nozzle. A liquid sheet is typically formed to a thickness of the order of 25-75 microns and a width of several inches. Atomization of the extended liquid sheet is initiated within the throat by the compressed air that is flowing at high velocity, in the same direction, on both sides of it. For fine atomization with a linear VGA nozzle, the throat velocity is typically sonic, with pressures generally ranging from 30 to 60 psig. The fine droplets form a flat extended spray plume as they are carried in the high velocity air stream issuing from the nozzle. The ambient flue gas is immediately entrained by aspiration, as it sweeps aerodynamically around the cylindrical nozzle enclosure. Low pressure air from a blower, termed secondary air, is delivered within the cylindrical lance in the space surrounding the nozzle-manifold assembly to exit as it sweeps over the curved faces of the linear nozzle. In the case of dry chemical injection, the finely divided, solid air-conveyed reagent is delivered in an annular channel formed by an additional outer cylindrical enclosure. The dry particles are rapidly and uniformly drawn into the exiting plume of finely atomized water spray so as to facilitate their solubilization. For initial tests of combined atomization and dry lime injection within the single enclosure, an additional outer tube was added to a linear nozzle having a cylindrically curved face such as that illustrated in FIG. 2. The flow of secondary air over the cylindrical nozzle faces was subsequently found to be inadequate in preventing deposition of lime on the nozzle face as the result of turbulent eddies. To eliminate the deposition, several modifications were later undertaken.

Atomization of the thin flat sheet offers additional operating advantages compared to conventional nozzle design. The liquid, sheet-forming channel is in the form of a prism. Its converging walls, which divide it from two similar channels that feed compressed air to the opposite surfaces of the inserted liquid sheet, are constructed as cantilevered elements. By varying the liquid or gas pressure, the thickness of the liquid sheet is varied. This occurs because the cantilevered, sheet-forming walls deflect to thereby change the tip width. Similarly, the width of the nozzle exit can be varied by deflecting the walls of the nozzle exit throat. These features enable the spray droplet size to be varied to suit the injection needs of the particular process and chemicals involved. In addition, momentary deflection of the walls dividing the liquid and air feed channels may be employed to dislodge any oversized solid particles introduced by the liquid.

To expose all of the flue gas to the injected droplets, a multiplicity of linear nozzles is assembled, end-to-end, at suitable intervals within a cylindrical lance. The atomized spray, which issues through a series of rectangular openings along the lance, forms an extended plume. The plume expands laterally at angles that are relatively narrow compared to the expansion angle of conventional, conical spray nozzles. Droplet-to-droplet and wall impingement are minimized as it expands to form a virtually continuous flat spray plume extending across the full width of the flue gas duct. Additional lances, installed, side-by-side, in a plane extending across the full width of the duct, insure that all of the flue gas is so treated. The flue gas, flowing in the same general direction as the spray plume, is rapidly entrained into the expanding high velocity air stream as it passes the array of cylindrical lances. A large percentage of the flue gas is thus immediately contacted to enable rapid mass and heat transfer between the gas and liquid phases. The mixing of the flue gas with the stream of expanding air and fine droplets issuing from the nozzles immediately initiates the desired process reactions. The combination of the linearly configured nozzles and lances and the parallel, co-current flow of the liquid and gas streams provides a significant additional advantage over similarly configured lances employing conventionally designed nozzles.

It was generally realized, and confirmed by the DOE sponsored test programs, that the closer to its wet bulb temperature that the flue gas could be cooled, the higher was the percentage of removal of $SO_2$. Efforts to achieve a close approach resulted in excess carryover of water droplets into the downstream, bag-house, filters used to collect the spent lime. In order to resolve the question of duct residence time required to sufficiently evaporate the droplets, an in-house, numerical analysis procedure was devised. It involved stepwise calculations of the evaporative heat and mass transfer at small temperature intervals for the various droplet sizes (grouped into increments) of the size distribution data obtained from spray nozzle tests. Table I, which summarizes the results, is presented to show the need for sufficiently small droplet size and adequate time in order to achieve complete reactions between flue gas constituents and chemicals injected as solids or atomized from solutions or slurries:

TABLE I

RESIDENCE TIME vs. PERCENT EVAPORATED
Cooling From 275° C. to 70° C. (527° F. to 158° F.)

| VGA NOZZLE TESTS | | | | MASS PERCENT UNEVAPORATED Vs. TIME IN SECONDS: | | | | | |
|---|---|---|---|---|---|---|---|---|---|
| GPM | SMD | ALR | RESIDENCE TIME | 1.0 | 0.5 | 0.1 | 0.05 | 0.01 | 0.005 |
| 1.6 | 18 | 1.0 | % UNEVAPORATED: TIME, SECONDS: | 0.5 | 0.7 | 0.9 | 1.0 | 1.1 | 1.2 |
| 1.6 | 22 | 0.82 | % UNEVAPORATED: TIME, SECONDS: | 0.7 | 0.8 | 1.2 | 1.4 | 2.0 | 2.1 |
| 1.6 | 23 | 0.7 | % UNEVAPORATED: TIME, SECONDS: | 1.2 | 1.5 | 2.6 | 3.0 | 4.0 | 4.3 |
| 3.2 | 29 | 0.44 | % UNEVAPORATED: TIME, SECONDS: | 1.4 | 1.9 | 3.0 | 3.4 | 4.4 | 4.8 |
| 4.0 | 26 | 0.6 | % UNEVAPORATED: TIME, SECONDS: | 2.1 | 2.7 | 4.2 | 4.9 | 6.1 | 6.5 |
| 4.8 | 34 | 0.25 | % UNEVAPORATED: TIME, SECONDS: | 2.4 | 3.1 | 5.0 | 5.8 | 7.5 | 8.1 |

NOTES:
GPM = Gallons per Minute
SMD = Sauter Mean Diameter, or diameter of average surface/volume-ratio
ALR = Air to Liquid Mass Ratio The gas temperature change employed in the computations, though somewhat larger than that generally encountered in power plant flue gas ducts, is applicable to water atomization with injection of dry lime or to slurry atomization. While the required evaporation time decreases significantly with increased exit gas temperature, decreasing the inlet gas temperature has a relatively small effect. As indicated, 99 percent of the water is rapidly evaporated. However, the remaining small percentage of droplets (which are the un-evaporated portions of the largest sizes present in the initial distribution of droplet sizes in the spray) requires a considerably longer period to evaporate. This is because the large decrease in flue gas temperature that has already occurred results in considerably reduced driving force for further evaporation. Without providing additional duct residence time, the small percent of remaining un-evaporated droplets will accumulate in the downstream solids collectors to present disposal problems. It is estimated that the accumulation of moisture in a bag house type filter, from as little as 1% un-evaporated droplets, assuming evaporation there to near equilibrium at the wet bulb temperature of the flue gas, can reach 8%. This compares to a recommended 2% maximum allowed for recycle or waste disposal.

Two additional tables are presented to show the comparison of in-house tests with dry lime, separately injected, of a linear VGA nozzle and of a commercial, fine-droplet, air-atomizing nozzle, with summary data on in-duct injection published by DOE. Table II compares VGA test data with data published by DOE. In the VGA tests, a 3-4 second residence time was allowed, confirming the minimum time requirement indicated by the in-house analysis. The benefit of a close approach to the flue gas wet bulb was confirmed by the VGA tests in which up to 86% removal of $SO_2$ was obtained with dry lime injection at a calcium/sulfur mass ratio of 1.5 (i.e., 50% excess) compared to the ratios of 2.5 to 3 previously required in the DOE program. In Table III, the percent $SO_2$ removal, with the data from VGA tests of a conventional type commercial nozzle, are presented together with that of DOE. The percentage removal of $SO_2$ was significantly lower, and in the same range as that published by DOE.

TABLE II

SULFUR DIOXIDE REMOVAL vs. Ca/S RATIO
VGA vs. DOE @ Approach to wet Bulb, Deg. F.

| | WET BULB, ° F. | RATIO | $SO_2$ REMOVED |
|---|---|---|---|
| VGA NOZZLE TEST DATA | 24 | 1.3 | 73 |
| VGA NOZZLE TEST DATA | 23 | 1.6 | 80 |
| VGA NOZZLE TEST DATA | 17 | 1.7 | 86 |
| VGA NOZZLE TEST DATA | 27 | 1.7 | 71 |
| VGA NOZZLE TEST DATA | 30 | 1.8 | 76 |
| VGA NOZZLE TEST DATA | 25 | 1.9 | 71 |
| VGA NOZZLE TEST DATA | 26 | 2.3 | 85 |
| VGA NOZZLE TEST DATA | 31 | 2.4 | 75 |
| VGA NOZZLE TEST DATA | 41 | 3.2 | 85 |
| VGA NOZZLE TEST DATA | 47 | 3.2 | 74 |
| VGA NOZZLE TEST DATA | 50 | 1.2 | 48 |
| VGA NOZZLE TEST DATA | 38 | 1.3 | 52 |
| VGA NOZZLE TEST DATA | 48 | 1.6 | 48 |
| VGA NOZZLE TEST DATA | 63 | 2.7 | 42 |
| REPORTED BY DOE | 25-34 | 3.0 | 54 |
| REPORTED BY DOE | " | 2.5 | 50 |
| REPORTED BY DOE | " | 2.0 | 43 |
| REPORTED BY DOE | " | 1.5 | 36 |
| REPORTED BY DOE | 35-44 | 3.0 | 45 |
| REPORTED BY DOE | " | 2.5 | 42 |
| REPORTED BY DOE | " | 2.0 | 35 |
| REPORTED BY DOE | " | 1.5 | 29 |
| REPORTED BY DOE | 45-54 | 3.0 | 39 |
| REPORTED BY DOE | " | 2.5 | 35 |
| REPORTED BY DOE | " | 2.0 | 30 |
| REPORTED BY DOE | " | 1.5 | 23 |

TABLE III

SULFUR DIOXIDE REMOVAL vs. Ca/S RATIO
Commercial Nozzle Tests vs. DOE

|  | WET BULB, °F. | RATIO | $SO_2$ REMOVED |
|---|---|---|---|
| COMMERCIAL | 18 | 1.7 | 30 |
| NOZZLE TEST | 33 | 2.2 | 48 |
| DATA | 21(1) | 2.4 | 52 |
|  | 28(1) | 2.5 | 51 |
|  | 14(1) | 2.7 | 39 |
|  | 28 | 2.7 | 30 |
|  | 11 | 2.7 | 55 |
|  | 27 | 2.9 | 49 |
|  | 26(2) | 3.3 | 62 |
|  | 26 | 3.6 | 55 |
| REPORTED BY DOE | 25-34 | 3.0 | 54 |
| REPORTED BY DOE | " | 2.5 | 50 |
| REPORTED BY DOE | " | 2.0 | 43 |
| REPORTED BY DOE | " | 1.5 | 36 |
| REPORTED BY DOE | 35-44 | 3.0 | 45 |
| REPORTED BY DOE | " | 2.5 | 42 |
| REPORTED BY DOE | " | 2.0 | 35 |
| REPORTED BY DOE | " | 1.5 | 29 |
| REPORTED BY DOE | 45-54 | 3.0 | 39 |
| REPORTED BY DOE | " | 2.5 | 35 |
| REPORTED BY DOE | " | 2.0 | 30 |
| REPORTED BY DOE | " | 1.5 | 23 |

NOTES:
(1)= 50% Recycle of Lime
(2)= 70% Recycle of Lime

In order to optimally employ the linear VGA nozzle-lances in each of various injection processes for which they are suited, it is desirable to modify the duct or other enclosure through which the flue gas is flowing. The time required to complete the reactions between the injected chemicals and the adverse flue gas components varies considerably with the type of additive. The duct residence time, and the extent of any associated duct modification, required to complete the reactions involved in removal of NO and mercury also depends on the flue gas temperature. In the case of gas phase reactions, such as with injection of ozone for oxidation of nitric oxide and mercury vapor, the reaction time required is very short. It is essentially that required to diffuse the ozone throughout the flue gas stream. With the injection of solutions, slurries or dry solids, the time requirement is increased by the various inter-phase diffusions involved. This is particularly the case with respect to the collection of $SO_2$, in which the amount of water used to sufficiently cool and humidify the flue gas greatly increases the evaporation time required.

The oxides of nitrogen (mostly NO), present in the flue gas of all fossil fuels, are primarily the result of oxidation of the nitrogen in the combustion air. Since the concentration increases with combustion temperature and amount of excess air, it has, until recently, chiefly been a problem of concern with the burning of coal. Methods of reduction have included Selective Catalytic Reduction (SCR) and Selective Non-catalytic Reduction (SNCR) with high temperature injection of ammonia and urea, followed by wet scrubbing. With SCR, some of the $SO_2$ present is converted to $SO_3$, which is not efficiently removed in the wet scrubber.

A number of development programs are underway to find more cost-effective methods of removing the nitrogen oxides and mercury. Efforts are also being made to further reduce sulfur dioxide and sulfur trioxide emissions, so as to meet tighter limitations being mandated. When accomplished, this would enable resumption and expansion of power plants burning high sulfur coal, a lower cost and higher energy content fuel. In view of the recent emphasis on global warming, programs are also being undertaken to investigate ways and means of isolating and sequestering the carbon dioxide that is released in fossil fuel combustion.

The procedures being examined for eliminating these harmful constituents generally involve injecting into the flue gas stream chemicals that react with these constituents to form products that may be separated from the gas. The added chemicals may be in the form of aqueous solutions, slurries, gases or finely divided solids. The reactions involved are usually specific to each flue gas constituent, and require separate, sequential process steps. For the desired reactions to occur, three specific injection requirements must be met. These are common to all of the contaminant categories. The first requirement is that the gas stream contaminant must be absorbed into an injected liquid, adsorbed on to the surface of an injected solid or react in the gas phase with an additive that is vaporized into the gas stream or injected as a gas. The second requirement is that the injected chemical must be uniformly distributed throughout the flue gas stream so that all portions of it will be effectively treated. The third requirement is that sufficient time must be allowed for the desired reactions to occur.

The solutions now being undertaken or considered cover a wide range. They include full scale demonstration programs, pilot and laboratory scale operations and conceptual ones based upon known chemical reaction possibilities. Among the chemicals being injected are ozone, ($O_3$), chlorine dioxide ($ClO_2$), hydrogen peroxide ($H_2O_2$) and magnesium hydroxide ($Mg(OH)_2$).

With ozone injection, it must be produced on site for immediate use because of its short life. It is generated from delivered and stored liquid oxygen. This process, which has been demonstrated at full scale, converts the NO and $NO_2$ present to $N_2O_5$. This soluble, gaseous product readily forms soluble nitrate in the wet scrubber. The process is not only considered costly, but adds the hazard of the transportation and storage of the liquid oxygen needed.

With chlorine dioxide, because of its susceptibility to explosive decomposition, it must also be generated on site and immediately cooled and diluted to less than 3% in air for delivery to the flue gas. Because it has been shown to oxidize not only the $NO_x$ but also the mercury vapor that is present in coal flue gas in relatively small quantities, the development of a method for its use in flue gas cleaning is currently of interest.

The high oxidizing potential of hydrogen peroxide has led to considerable interest in employing it to oxidize the nitric oxide, preferably to $N_2O_5$, that is present in the flue gas. The effectiveness in this application results from its catalytic decomposition at elevated temperature into transient, gaseous free radicals such as nascent oxygen and the hydroxyl, OH. Tests to-date have indicated that, because of the fleeting presence of these reactive forms, concentrated solutions, large excess amounts of hydrogen peroxide and injection temperatures as high as 500 deg. C. may be required.

With partial oxidation of NO to $NO_2$, magnesium hydroxide is being utilized in combination with lime injection (for $SO_2$ capture) in medium/high sulfur applications to reduce the $NO_2$ to $N_2$ before emission.

The methods, processes and equipment in general use by the fossil-fuelled power generation industry do not adequately address the current and anticipated emission limits of the undesirable flue gas constituents. What is particularly lacking is a cost effective means of retrofitting the many existing coal-fired utility, commercial and industrial power plants. The curtailed major development of the DOE sponsored in-duct injection process showed considerable promise of providing such a low cost approach that could be broadly adapted to the industry's needs. Coupled with modification of flue gas duct configuration where required, a VGA nozzle and duct modification program was undertaken to meet this need.

SUMMARY OF THE INVENTION

In accordance with the present invention, methods and apparatus are provided which employ and expand upon the atomization means and teachings VGA. This invention includes modifications to VGA nozzles and nozzle-enclosing lances for flue gas cleaning by duct injection. In combination with associated flue gas duct modifications, they are intended to provide an affordable retrofit or new installation cost for power plant flue gas cleaning systems.

One VGA nozzle modification enables water or aqueous solutions or slurries plus dry hydrated lime or other dry chemicals or combinations thereof to be separately fed within the same nozzle-lance and to react together during and/or immediately following the atomization of the liquids. It divides the flow of the secondary air so that a portion of it intersects the entraining gas and solids mixtures and sweeps them away from the nozzle face. The other portion flows over the nozzle face to furnish the immediate entrainment flow demand by the expanding compressed. In so doing it minimizes recirculation eddies and deposition of solids on the nozzle face. The carrier-air-conveyed dry chemical, which is delivered within the same nozzle enclosure, is entrained by aspiration into the spray plume exiting the nozzle. The immediate mixing of the dry chemicals and water droplets enables the surface of the particles to be rapidly wetted and more effectively readied for reaction with targeted gaseous components of the combustion gas stream. By joining the water atomization and dry sorbent injection, surface wetting is increased in comparison with downstream injection in which the flue gas is already partially cooled by the very rapid evaporation of a large portion of the finer droplets in the spray. With upstream injection of dry sorbent, the sorbent can become pre-heated prior to exposure to spray droplets and increased water vapor, thereby decreasing the water vapor condensation on the particle surface.

Another VGA nozzle modification simultaneously mixes and atomizes reactive chemicals so that their volatile reaction products can be effectively utilized for further reaction with specific constituents of the flue gas stream. Reactive chemicals are separately fed to the region of mixing and atomization, within the exit throat zone of a gas atomizing nozzle. One example is the formation of chlorine dioxide ($ClO_2$), a highly reactive, free radical, oxidizing agent (e.g., by mixing sodium chlorate, an acid and a catalyst as generally employed in its commercial production). Its formation during atomization and release into the flue gas stream avoids the explosively hazardous gas generation that can result from pre-mixing. Another example is the formation of nascent oxygen and hydroxyl groups from decomposition of hydrogen peroxide by mixing acids and catalysts with it during atomization. Such intermediates are immediately employed (before their degradation or recombination) for their reaction with specific constituents of the flue gas stream. The immediate release of the finely atomized droplets of reacting chemicals into the adjoining, hot, flue gas stream (being aspirated by the expanding, high velocity atomizing air) enables the volatile reaction products to effectively react further with targeted flue gas constituents.

An associated flue gas duct modification provides the duct residence time needed to effectively accomplish the desired flue gas reactions. It does this by means of arrays of modified, linear VGA nozzles installed in modified flue gas ducts. Duct modification generally involves widening the duct and providing vertically upward and downward flow of flue gas at reduced velocity. For $SO_2$ capture, the required residence time is estimated to range from 3-4 seconds, minimum, to 6-8 seconds, maximum. The minimum upward velocity allowed is that needed to loft the maximum droplet size produced. For a 100 micron droplet, this is the order of 10 ft. per second. The upward, tower flow is followed by a similar downward passage. An array of linear VGA nozzle lances is typically installed so as to spray in the same direction as the flue gas, i.e., upward into the up-flowing gas stream, or downward if installed in a down-flowing stream. Inlet and exit flow transitions are also provided. Duct modification may also be employed where needed for removal of other adverse constituents of flue gas. The combination of modified linear VGA nozzles, lances and flue gas duct enclosure modification constitutes the VGA flue gas cleaning system designed to meet the emission limits of fossil fuel combustion.

DESCRIPTION OF THE PREFERRED EMBODIMENTS PERTAINING TO THIS INVENTION

Figure 1:
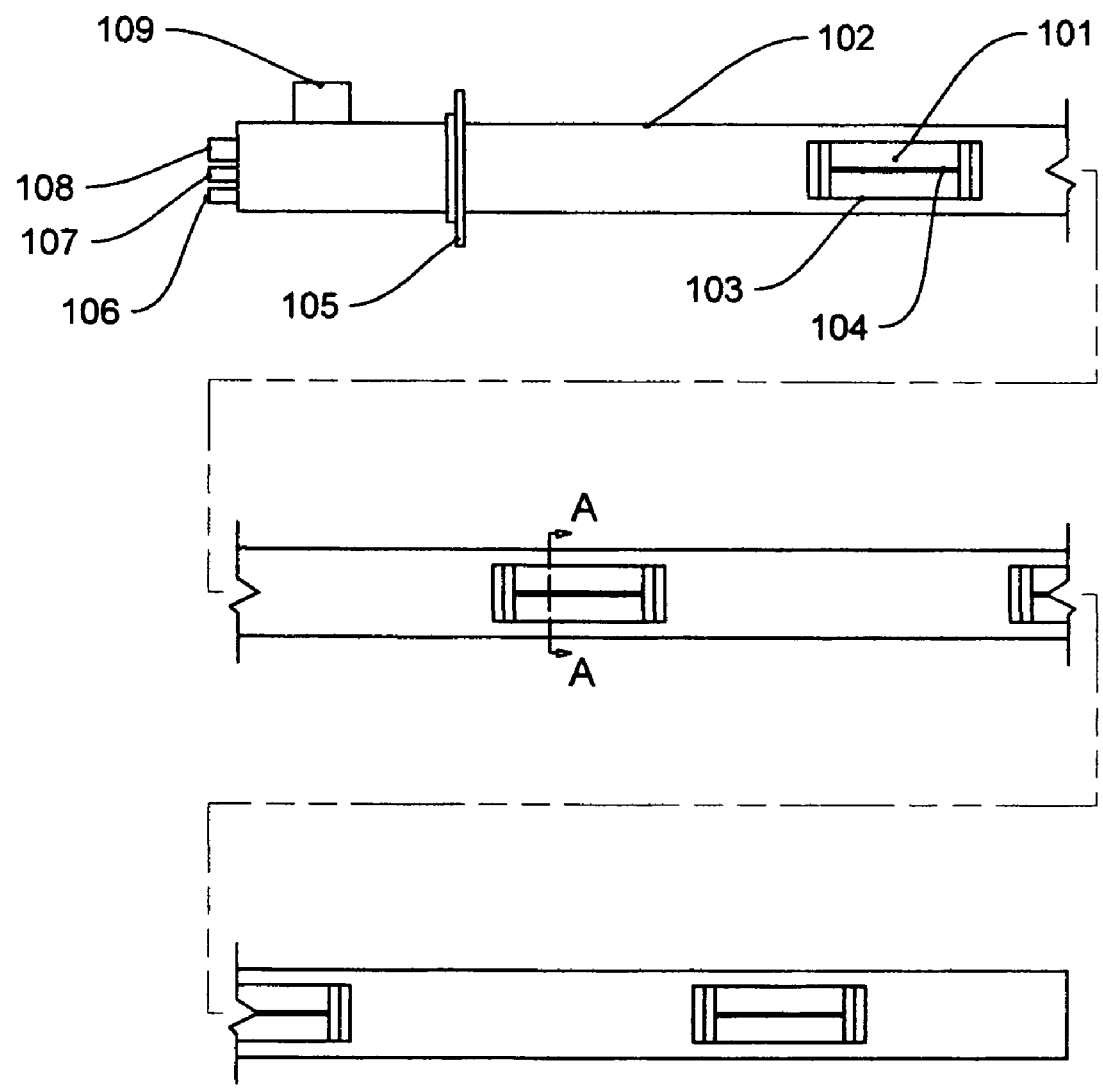
FIG. 1 shows a typical lance assembly of multiple modular units of linear VGA nozzles spaced at intervals along a lance fitted with rectangular window openings for spray exit.

FIG. 1 illustrates a typical VGA nozzle-lance as assembled for installation in a flue gas duct and as utilized with injection of dry hydrated lime for $SO_2$ capture. It is described herein by specific reference to FIG. 1. For the purpose of illustrating its length, typically about 20 ft., but generally ranging from the order of 10-30 ft., it is shown cut into three sections. Linear nozzles, 101 are located at suitable intervals within cylindrical tube/pipe lance 102 having rectangular windows 103 through which atomized spray issues from linear slits 104. Although, the illustration shows four nozzles, the number of nozzles and nozzle spacing may be varied to suit the flue gas duct size and capacity, with a general maximum of six nozzles per lance for uniformity of spray volume across a duct. The lance is fitted with pipe flange 105 for insertion through a duct wall. The inlet end is fitted with pipe fittings such as 106 for water feed, 107 for compressed, atomizing air, 108 for secondary, low pressure air sweep and 109 for air conveyed dry lime, as described in detail in FIG. 3, below.

Figure 2:
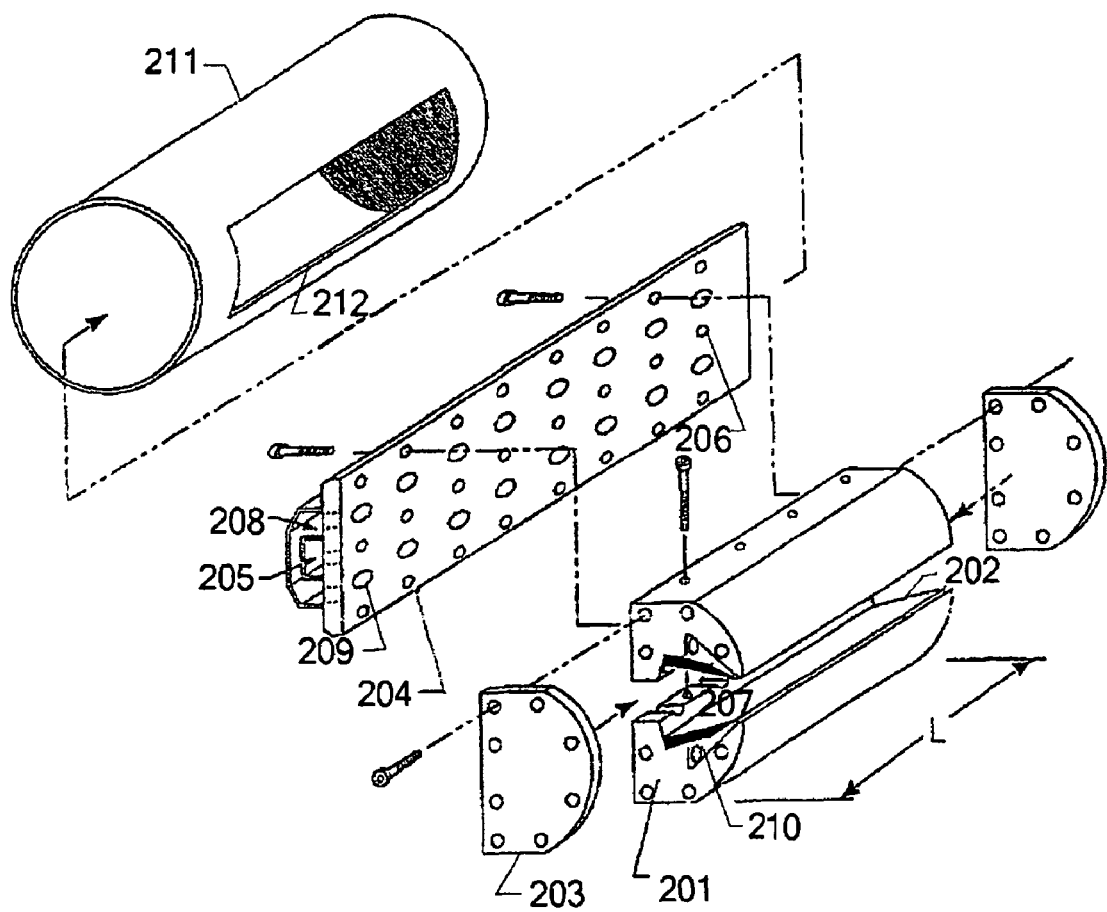
FIG. 2 shows an exploded view of a typical modular-unit, linear VGA nozzle configuration such as that employed in demonstrating its fine atomization characteristics.

FIG. 2 is an exploded view of a linear VGA nozzle as previously employed for fine atomization in application to flue gas humidification, and as typically installed as a modular unit in a lance. It is presented to illustrate the general construction features common to the nozzle modifications applied in the present patent application. The nozzle housing consists of two similar sidewall members, 201, mounted opposite to each other, two similar, internal, dividing wall plates, 202, mounted to the side walls, and two end closures, 203, all with flat mating surfaces. The assembled housing is similarly mounted to supporting back plate member 204. The liquid (water) to be atomized is fed through manifold channel 205, which is integrally attached (i.e., welded) to rear of back plate 204, and delivered through multiple ports 206 to feed channel 207 formed by converging dividing wall plates 202. Dividing wall plates 202 are mounted to sidewalls 201 as cantilevers that bend to allow their flat exit tips to open as liquid pressure is increased. Compressed air is delivered from similarly attached manifold 208 through ports 209 to two converging channels, 210, one each on the opposite side of each dividing wall 202 to atomize the liquid by contact with both liquid surfaces as it exits the nozzle in the form of a thin flat sheet. The assembly of nozzle(s), with back plate and manifolds, is inserted into cylindrical lance closure 211 having rectangular window 212 for spray exit. Back plate 204 and lance closure 211 may lengthened for mounting several nozzles in the lance.

Figure 3:
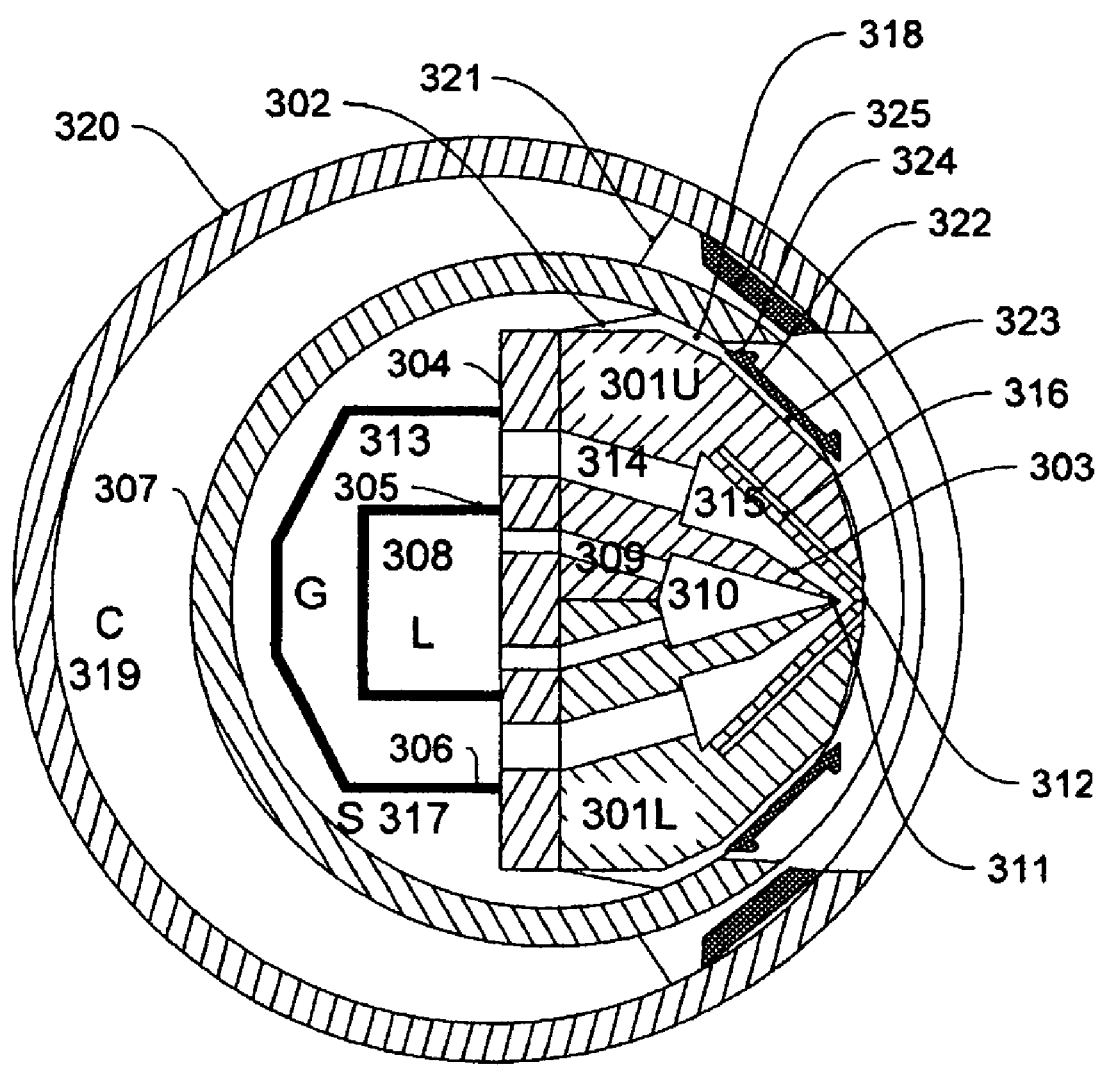
FIG. 3 shows a cross-sectional view of a typical linear VGA nozzle-lance as modified for conveying in an air stream a reactive chemical in the form of a finely divided solid, so that it immediately contacts and mixes fully with finely atomized water droplets issuing from a linear VGA nozzle.

The nozzle modification that is herein employed to enable the immediate and complete mixing of carrier-air conveyed dry chemical is illustrated by add-ons in FIG. 3, as modifications to the linear nozzle shown in FIG. 2. FIG. 3 shows a cross-sectional view of a linear VGA nozzle assembled with the modifications preferred for rapid wetting of dry lime particles and solubilizing of $SO_2$. The upper and lower side walls, 301U and 301L, are joined together and to end caps 302 to form the modular nozzle unit. Divider walls 303 may be formed integral with the side walls by casting or wire EDM fabrication. The material of construction typically used is type 316 stainless steel.

The backplane mounting plate 304 is fabricated and assembled with manifold enclosures 305 and 306. The mounting plate-manifold assembly may be extended as a unit to feed a number of modular nozzle units spaced at intervals within pipe shroud 307. All mating portions of surfaces of the modular nozzle components, and of the assembly of modular nozzles and mounting plate are ground flat so that gaskets are not required.

Referring again to FIG. 3, the liquid L, in order to be atomized, is fed through manifold 308, and multiple ports 309 to converging liquid feed channel 310 to be formed as a thin sheet as it exits through slit 311, formed at the ends of divider walls 303. It then flows into thin slit 312 forming the exit, or throat of the nozzle. Compressed atomizing air G is fed from air manifold 313 through multiple ports 314 into two converging air feed channels 315, one on the opposite side of each divider wall 303. The two air streams then flow within the slit shaped throat on opposite surfaces of the thin liquid sheet being atomized. The two divider walls, 303, which are in the form of cantilevers, deflect slightly, as a function of the pressure difference between the atomizing air and liquid. As customarily employed to produce finely atomized liquid droplets, the deflection is such as to produce a sheet width in the range of 0.001 to 0.002 inches (25 to 50 micrometers), or generally of the same order of magnitude as the desired mean droplet size of the spray produced. The cantilevered walls may be further deflected with a short duration liquid pressure increase to produce a wider opening so as to pass any wedged particles. Two slits 316, in side walls 301 enable the width of the nozzle exit throat, formed by exit slit 312, to also be similarly varied by wall deflection, as a function of the atomizing air pressure. The method of atomization control for production and variation of fine droplet sprays utilizes the liquid surface shearing action produced by two high velocity air streams flowing on opposite sides of a thin liquid sheet that is flowing at a relatively low velocity. Secondary, low pressure air S, such as produced with a blower, is conveyed through annular space 317, formed between the nozzle assembly and shroud 307, to exit through the rectangular windows 318, and sweep over the nozzle face to merge with the linear spray plume formed by exit throat 312. The nozzle face may be curved in the form of a circular arc, as pictured in FIG. 2, or as a flat, beveled surface as shown in the modified version of FIG. 3 for improved control of secondary air flow. The secondary air serves to direct the flow of aspirated flue gas flowing around the cylindrical lance so as to minimize undesirable eddy formation causing deposition of solid particulate on the nozzle face adjoining the exit slit throat.

Dry chemical C, e.g., dry lime as used for reaction with $SO_2$, is conveyed by low pressure carrier air in annular manifold channel 319 formed by outer pipe lance 320 and inner-lance shroud 307. The two lances are fastened together, eccentrically, with spacers 321. The flows of secondary air S through windows 318, one on each side of the nozzle face, are both divided by the addition of the two secondary air control bars 322 so that each exits partially through two separate channels 323 and 324. The widths of channels 323 and 324, which are sized so as to uniformly distribute exit air flows along the nozzle and multiple-nozzle lance, are determined by the positioning of control bars 322, which, in turn, may be attached to the flat faces of the nozzle by use of mounting screws and spacers (not shown) or to end plates 321. The air that flows through channels 324 serves to redirect the exiting flows of air conveyed solid chemical, such as lime, away from the nozzle face. Carrier air control bars 325 also form slit shaped exits with opening widths sized to uniformly distribute exit flows of carrier air and dry solids.

Alternatively, a nozzle-lance consisting of the inner lance 307 portion, without the outer lance 320 portion shown in FIG. 3, may be utilized for fine atomization of water, aqueous solutions or slurries. With abrasive slurries, divider walls 303 may be fabricated as separate plates and attached to the side walls 301, as shown in FIG. 2, and formed of a hardenable material, such as stainless type 440C, for improved wear, and removable for maintenance if needed.

Figure 4:
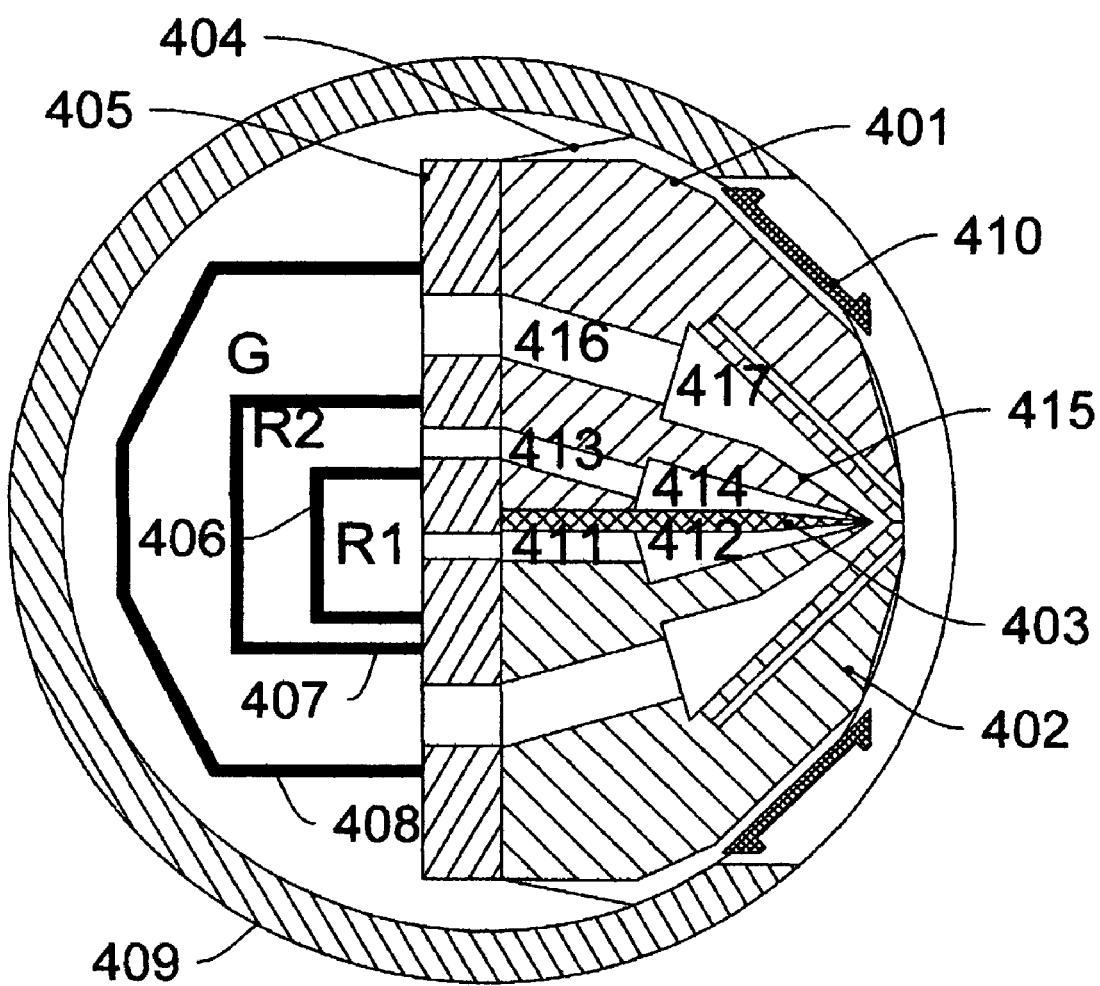
FIG. 4 shows a cross-sectional view of a typical linear VGA nozzle-lance as modified for simultaneous mixing and atomization of reactive chemicals.

FIG. 4 illustrates a cross-sectional view of a linear VGA nozzle of a generally similar configuration to that of FIG. 2, but as modified for simultaneous mixing and atomization of reactive chemicals. As typically practiced, one side wall 401, when assembled with second side wall 402, is separated by channel divider 403. The two side walls are assembled with end walls 404 to form the modular nozzle unit. Backplane mounting plate 405 is fabricated and assembled with manifold enclosures 406, 407 and 408. The mounting plate and manifold assembly is installed within cylindrical lance tube 409. Its length may also extend the full length of a lance along which multiple nozzles and windows placed at suitable intervals. The face of the nozzle is beveled to accommodate two secondary air control bar assemblies 410. Reactive chemical R1 is delivered through manifold 406 and multiple ports 411 to converging feed channel 412. Reactive chemical R2 is fed through manifold 407 and multiple ports 413 to converging channel 414, on the opposite side of channel divide 403. The two reactive chemicals merge to form a thin sheet at the exit slit formed by divider walls 415. Compressed air G is fed through manifold 408 and ports 416 to converging channels 417. The divided air flow atomizes the thin liquid sheet by its action on the two opposite liquid surfaces. The simultaneous mixing and atomization of the two reactive chemicals generates highly reactive transient, gaseous products that are immediately utilized upon release to oxidize adverse constituents in the flue gas such as nitric oxide, NO, and mercury vapor.

One example is the reaction of sodium chlorate, $NaClO_3$, with a mixture of sulfuric acid and methanol to produce the strongly oxidizing gas, chlorine dioxide, $ClO_2$. The reactants are separately fed as solutions to be mixed as they are being delivered as a thin liquid sheet into the atomizing nozzle throat. By forming it into fine spray droplets, the highly reactive product of the reaction, $ClO_2$, is immediately mixed with the entrained flue gas as it is released from the droplets. The safety problems inherent with pre-production of $ClO_2$ in a separate, on-site generator are avoided because the $ClO_2$ does not have to be immediately cooled and highly diluted, as it is being formed, to less than 3% concentration, to prevent explosive decomposition.

Another example is the decomposition of hydrogen peroxide, $H_2O_2$, by a catalyst such as manganese dioxide, $MnO_2$, or ozone, into nascent oxygen, O, and the hydroxyl, OH. In the first case, slurry of $MnO_2$ is fed separately from a solution of $H_2O_2$, and the two are mixed together as they are being delivered as thin sheets into the zone of atomization in the nozzle exit throat. Alternatively, ozonized compressed air may be used to atomize the $H_2O_2$ solution.

Figure 5:
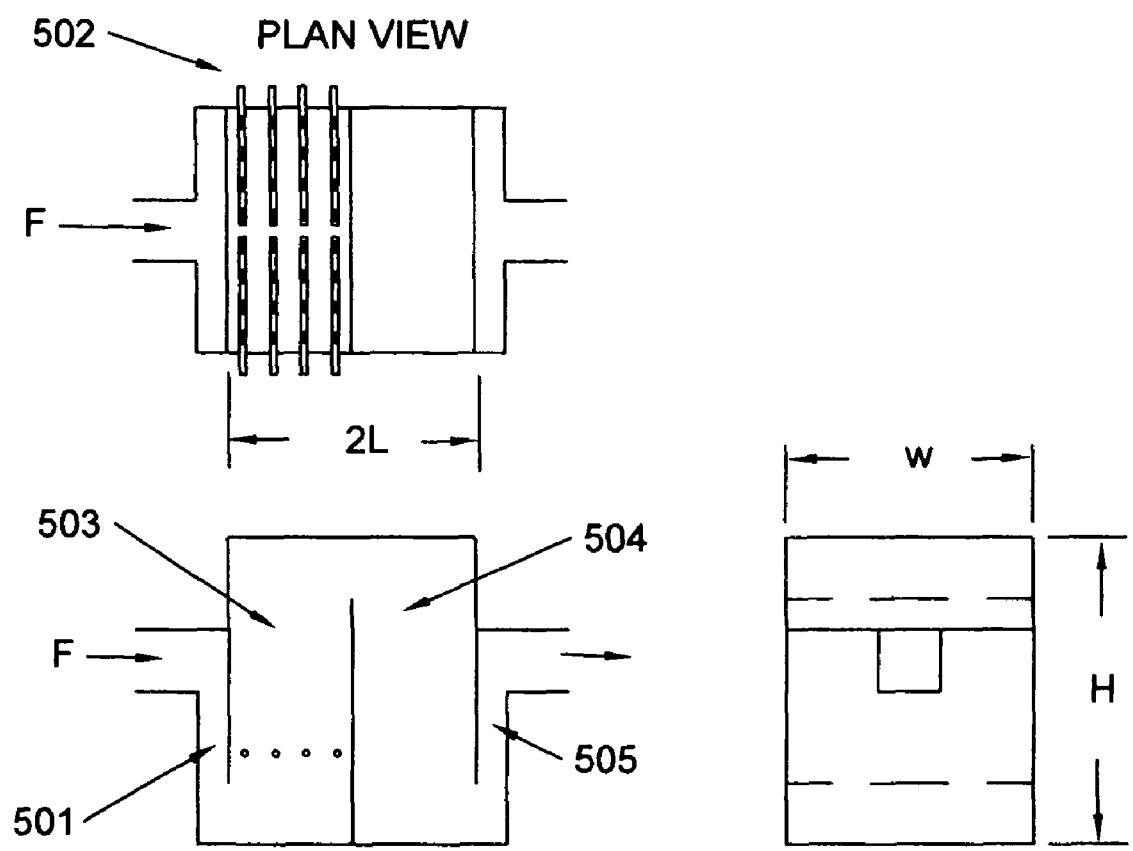
FIG. 5 shows a typical modified flue gas duct with linear VGA nozzle-lances installed.

FIG. 5 illustrates the modification of a flue gas duct, in the form of a tower, to provide the time needed for completion of the multiphase processes involved in the capture of $SO_2$ either by injected dry lime and finely atomized water or by lime slurry. Three outline views are provided. Flue gas F first flows downward in entry-transition plenum 501, which is provided in order to reduce the flue gas velocity and to uniformly distribute the gas as it enters the tower proper. It then flows upward to pass the array of nozzle lances 502, which are shown oriented so as to spray upward. Flue gas F and entrained spray plume then exit first tower section 503, reverse direction, flow downward in second tower section 504 and out through exit-transition plenum 505 to the original sized duct. While the transition plenums are shown as simple, rectangular enclosures, they may be shaped otherwise or include turning vanes such as one skilled in the art would provide. Tower heights are typically 40-50 ft. at a flue gas minimum velocity of 10 ft/sec. An example of some approximate tower widths, W, and two-section lengths, 2 L, are tabulated for a range of power plant outputs in megawatts as follows:

| MW | 15 | 30 | 60 | 120 | 240 | 480 |
|---|---|---|---|---|---|---|
| Width, W, ft.: | 10 | 10 | 20 | 40 | 40 | 80* |
| Length, 2L, ft.: | 16 | 32 | 32 | 32 | 64 | 64 each |
| No. of Lances: (4 nozzles/lance) | 2 | 4 | 8 | 16 | 32 | 64 |

*Two parallel 40 ft. towers

The dimensions are selected to provide ample, 8 sec., residence time for removal of $SO_2$. The tower is made wider than the flue gas duct so that the velocity of the flue gas is reduced from its nominal duct velocity, of the order of 50 ft. per second, to one that provides a duct residence time sufficient for completion of desired reactions and for essentially complete evaporation of atomized water.

As shown in FIG. 5, eight lances are inserted, four each from opposite sides of the tower. As indicated by the accompanying table, the eight lances, each with four linear nozzles, are such as would be typically furnished to provide the 8 second, residence time with a 60 MW power plant. The large number of nozzles provides a finer degree of atomization than has typically been achieved with spray dryers and their conventional rotary disk atomizers. The rectangular construction of the widened tower-duct design enables a multiple array of VGA nozzle-lances to uniformly distribute the spray throughout the flue gas duct cross section. It also allows for operation without the droplet-droplet impingement or wall deposition that occurs with conventionally designed nozzles. The lances would be made individually removable for annual maintenance. While not shown, simple I-beam supports with commercially available, carbide rollers can be provided for ease of insertion and removal.

The upward flow in the first tower section also provides some increased residence time for the largest droplets, which are relatively settling downward, by gravity, at an appreciable rate (about 3 ft. per sec. for a 100 micron diameter water droplet). If necessary, increased tower velocities and higher towers can be employed to accommodate coarser sprays or a smaller cross-sectional area. Downward flow of flue gas and spray in the first section (and upward in the second) can also be employed (with increased tower height) if needed to accommodate existing power plant retrofit. Variations, including additional tower sections, may be provided to accommodate other process steps. Other variations include incorporation of a bag house type particulate collector within the tower ahead of the exit transition.

In considering the retrofitting of existing power plants, the individual flue gas cleaning operations (oxidation of nitrogen oxides and mercury, dry lime neutralization of sulfur oxides and collection of reaction products) may be undertaken in various alternative, sequential steps, among which the following are briefly outlined:

Sequence 1: Oxidation+Neutralization+Dry Solids Collection—The cost effectiveness of this sequence depends upon the degree of preferential oxidation of $SO_2$ compared with oxidation of NO to $N_2O_5$ as reflected in the relative cost of oxidizing chemicals compared with lime.

Sequence 2: Partial Neutralization+Oxidation+Dry Solids Collection—This sequence would reduce the consumption of higher cost oxidizing chemicals compared to that of lime.

Sequence 3: Maximum Neutralization of $SO_2$+Dry Solids Collection+Post Oxidation of NO and Mercury+Acid Scrubbing—Minimizing the cost of oxidizing chemicals is offset by the added cost of acid scrubbing.

Sequence 4: Pre-oxidation of NO to $NO_2$+Combined $SO_2$ Neutralization and Magnesium-Based Chemical reduction of $NO_2$ to $N_2$+solids Collection—The oxidation/reduction process is now being tested in conjunction with the use of oxidants such as $H_2O_2$ as an alternative to the proprietary BOC Gases process ($LoTO_{xTM}$) of ozone oxidation to $N_2O_5$ Sequence 5: Fly Ash Collection+Pre-oxidation of NO and $SO_2$+Acid Scrubbing.

In addition to employing the three operations as elements in various sequences, such as outlined above, they may be separately incorporated as retrofits to supplement or replace individual components of existing power plants. The following are examples:

1. The flue gas oxidation step may be added upstream of existing wet or dry scrubbers.
2. The linear VGA nozzle-lances with lime slurry or combined dry sorbent injection may be retrofitted to existing spray dryers in lieu of costly rotary disk spray nozzles.

These and all such other variations which are obvious to one skilled in the art are deemed to within the scope of the appended claims except where expressly limited otherwise.

I claim:

1. A method of controlling flows of secondary, low pressure air and carrier-air-conveyed dry chemical within a cylindrical enclosure containing at least one linear VGA nozzle, said VGA nozzle emitting high velocity air and atomized spray through a common window formed in said cylindrical enclosure, the method comprising:

delivering in separate channels, said flows of secondary, low pressure air and carrier-air-conveyed dry chemical within said cylindrical enclosure;

dividing each of said flows into two streams to thereby exit said cylindrical enclosure on opposite sides of said VGA nozzle through said common window;

further dividing each of the two divided streams of said secondary, low pressure air into two separate portions;

directing one portion of each of said further divided streams of said secondary, low pressure air to flow toward the spray exiting from said VGA nozzle so that said portion is entrained into a plume of said exiting spray by an expansion of said high velocity air, thereby effecting a smooth and immediate dilution of the spray without adverse deposition of solids on a face of said VGA nozzle from eddy recirculation of droplets; and directing the other portion of each of said further divided streams of secondary, low pressure air to flow substantially parallel with the flow of said exiting spray and to intersect and thereby divert, from the immediate vicinity of said exiting spray as it exits the nozzle, the flow of said carrier-air-conveyed dry chemical and a flow of ambient gas sweeping around said cylindrical enclosure, as the flow of said carrier-air-conveyed dry chemical is being entrained into the expanding high velocity air.

2. The method according to claim 1, wherein the step of further dividing each of the two divided streams of said secondary, low pressure air into two separate portions is facilitated by two flow control bars attached to said VGA nozzle, each flow control bar thereby allowing one of said portions to flow toward the exiting spray and direct the other portion to intersect the exiting flow of said carrier-air-conveyed dry chemical and the flow of said ambient gas sweeping around said cylindrical enclosure.

3. The method according to claim 2, further comprising:

installing arrays of said cylindrical enclosures being in the form of VGA nozzle lances, each lance containing a plurality of said VGA nozzles, in a duct portion of a utility, commercial or industrial power plant flue gas conveying duct to thereby inject chemical sorbents in either carrier-air-conveyed dry form or in the form of slurry for the purpose of removal of sulfur oxides;

wherein said duct portion forms a series of at least two vertical tower sections in which said flue gas flows vertically, upward or downward, in one of said tower sections, then reverses direction and returns to exit at the original entry level in another of said at least two tower sections;

wherein a flue gas velocity is reduced to a range of between 10-20 ft/sec. by an increased cross-sectional area of said tower sections, thus providing an increase in duct residence time while maintaining a minimum velocity sufficient to prevent settling of large particles and un-evaporated droplets;

wherein the cross-sectional areas of said tower sections have horizontal widths and horizontal lengths sized to provide a sufficient upward-flowing gas velocity while accommodating a required number of VGA nozzles and lances to produce desired fluid injection rates and degrees of atomization; and wherein said duct portion includes inlet and outlet transition plenums to provide uniform gas distribution and minimize solid particulate deposition upon flue gas entry to and exit from the tower sections.

4. A method of mixing and atomizing separately fed liquids, which react together upon being mixed, within a linear VGA nozzle, the method comprising:

feeding said liquids separately into adjoining channels of said linear VGA nozzle;

forming the flows of said liquids within said adjoining channels so that the flows merge and exit said channels as a thin, unsupported flat sheet;

wherein said thin, unsupported flat sheet exhibits a thickness within a range of between 0.001 to 0.004 inches;

feeding compressed air into two channels, one of said two compressed air channels being located on one side of said two adjoining liquid feed channels and the other of said two compressed air channels being located on the opposite side of said two adjoining liquid feed channels, so that said compressed air flows in substantially the same direction as the liquid; and forming the flows of said compressed air within the two channels so that they converge at an acute angle relative to said unsupported liquid sheet and contact opposite surfaces of said unsupported liquid sheet at a relatively high velocity, thereby causing atomization of said unsupported liquid sheet as it flows through an exit slit forming a throat of said linear VGA nozzle.

5. The method according to claim 4, wherein said adjoining channels are fluidly connected to corresponding separate supply channels and feed ports for delivering reactive chemicals separately into said adjoining channels;

wherein the step of forming the flows of said liquids within said adjoining channels so that the flows merge and exit said channels as a thin, unsupported flat sheet is facilitated by locating a dividing wall within a converging-wall liquid feed channel in said linear VGA nozzle, said dividing wall having a tapered downstream end which tapers to a flat, thin edge having a thickness within a range of between 0.005 to 0.020 inches to thereby merge the flows of said separately fed reactive chemicals;

wherein the step of forming the flows of said liquids within said adjoining channels so that the flows merge and exit said channels as a thin, unsupported flat sheet is further facilitated by tapered walls of said converging-wall liquid feed channel which meet at terminating ends thereof and deflect to open with increasing liquid pressure to form said exit slit of said linear VGA nozzle; and wherein said dividing wall terminates upstream of said terminating ends of said tapered walls of said converging-wall liquid feed channel at a distance within a range of between 0.10 to 1.0 inches therefrom, depending upon a relative speed of reaction of the separately fed chemicals.

6. The method according to claim 5, further comprising:

installing arrays of a plurality of said linear VGA nozzles, in a duct portion of a utility, commercial or industrial power plant flue gas conveying duct to thereby inject chemicals in the form of slurries or solutions for the purpose of oxidizing sulfur oxides, nitrogen oxides or mercury;

wherein a flue gas velocity is reduced by an increased cross-sectional area of said flue gas duct portion, thus providing an increase in duct residence time while maintaining a minimum velocity sufficient to prevent settling of large particles and un-evaporated droplets.

* * * * *